United States Patent Office.

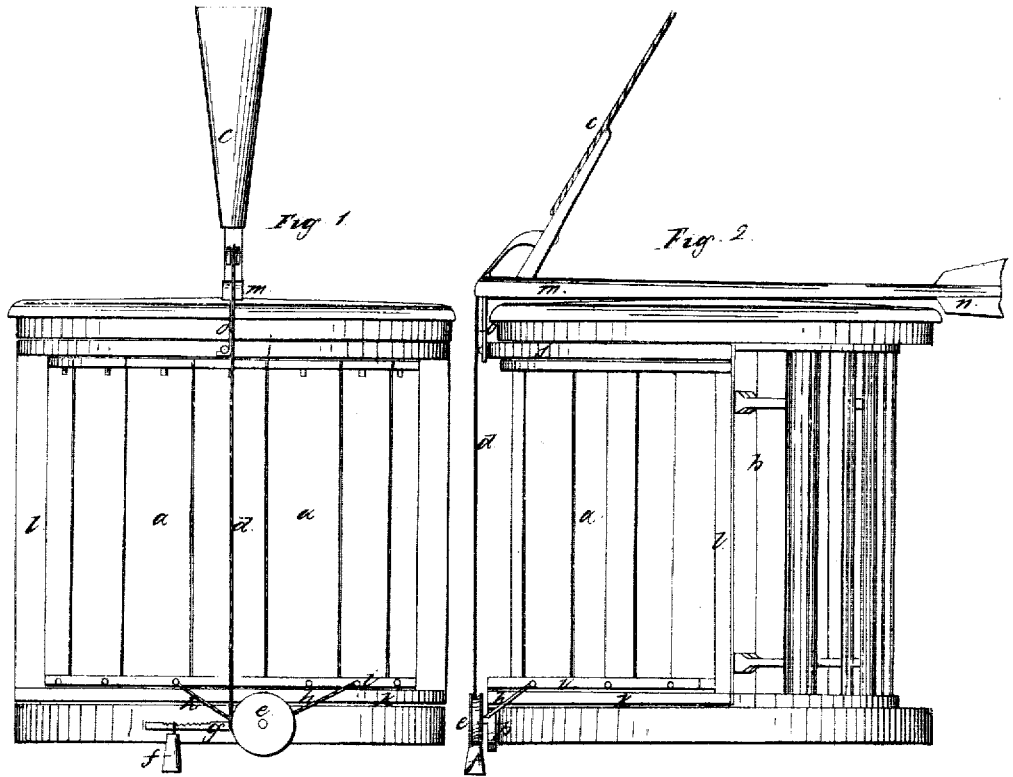
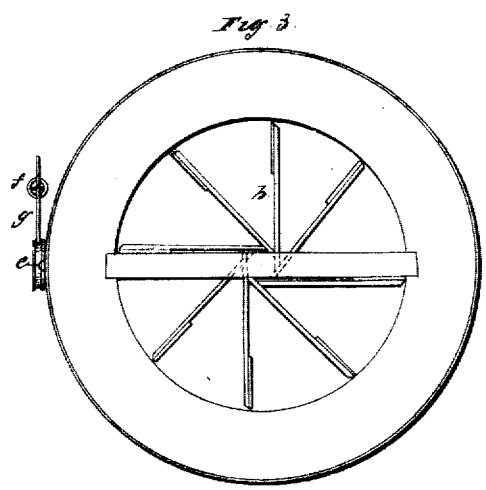

GEORGE H. REISTER, OF WASHINGTON, IOWA.

Letters Patent No. 91,868, dated June 29, 1869.

IMPROVEMENT IN WIND-WHEELS.

The Schedule referred to in these Letters Patent and making part of the same.

*To all whom it may concern:*

Be it known that I, GEORGE H. REISTER, of Washington, in the State of Iowa, have invented a certain new and useful Improvement on Wind-Wheels; and I do hereby declare that the following is a full, clear, and exact description of the construction and operation thereof, reference being had to the accompanying drawings, and to the letters and marks thereon, which said drawings form part of this specification, and represent a wind-wheel having my improvement as a part thereof—

Figure 1 being a front view,

Figure 2, a side view, and

Figure 3, a top view when the cap and vanes are removed, so as to show the interior of the wheel.

In each of these figures, like marks and letters are used to indicate like parts.

This invention is of the character of an additional improvement to a wind-wheel on which a patent was granted to me on the 29th day of November, 1864. In that wheel the movable guides $a$, for regulating the ingress of the air or wind, entirely surrounded the wheel $b$; the movable guides being operated, as here shown, by a vane, $c$, from which a cord, $d$, passes down to a pivoted wheel, or pulley $e$, balanced by a weight, $f$, on the arm $g$, cords $h$ being attached to pulley $e$ and band $i$ of the movable guides.

These movable guides are so actuated by the vane $c$ as to have diminished openings between them when the wind blows free or hard, and by the weight $f$, to have increased openings when the wind is light.

As the guides entirely surround the wheel in the patented invention herein alluded to, there would be the same amount of openings or area for the egress of the wind after operating on the wheel that there was for its ingress; and experiment indicated that the wheel labored under this arrangement of the movable guides. The present invention is intended, therefore, to relieve the wheel of this disadvantage, which is effected, as is more clearly shown by fig. 2 of the drawings, by having the movable guides cover one-half or a section only of the wheel $b$.

These movable guides $a$ are pivoted at the top and bottom in the frame-pieces $j$ and $k$.

Vertical pieces $l$, with the pieces $j$ and $k$, make up the frame for the movable guides.

In the pieces $j$ and $k$, rollers are inserted, for facilitating the movements of the frame and guides.

The upper piece $j$ is connected to the bar $m$ of the vane $n$ by the rod $o$, and as the pulley $e$ is pivoted on a block, $p$, affixed to the lower frame-piece $k$, the entire frame, guides, and devices, or means connected therewith, are moved in the direction of the wind by the vane $n$, leaving a large portion of the wheel $b$ uncovered by the guides, and thus allowing the wind free egress or escape after it has operated on the wheel.

The estimate made from the experiments entered upon is that this improvement gives full double the power to the wheel that it will have if the entire wheel be covered by the guides.

What I claim as my invention, and desire to secure by Letters Patent, as an improvement on wind-wheels having guides for the wind, is—

The system of movable guides, as described, when arranged to cover only a segment of a circle.

This specification signed, this 25th day of August, 1868.

GEO. H. REISTER.

Witnesses:
 A. O. COOK,
 JOHN GALLUP.